Sept. 26, 1967 P. R. HELMS 3,343,236
RAM CORE MOLDING MACHINE
Filed Jan. 27, 1965 3 Sheets-Sheet 2

INVENTOR.
Paul R. Helms
BY Newton, Hopkins,
Jones & Ormsby
ATTORNEYS

Sept. 26, 1967 P. R. HELMS 3,343,236
RAM CORE MOLDING MACHINE
Filed Jan. 27, 1965 3 Sheets-Sheet 3

INVENTOR.
Paul R. Helms
BY Newton, Hopkins,
Jones & Ormsby
ATTORNEYS

United States Patent Office 3,343,236
Patented Sept. 26, 1967

3,343,236
RAM CORE MOLDING MACHINE
Paul R. Helms, Rte. 1, Jones Road, Roswell, Ga. 30075
Filed Jan. 27, 1965, Ser. No. 428,479
8 Claims. (Cl. 25—30)

This invention relates to a ram core pipe molding machine and is a companion application of my previous application entitled, "Pipe Molding Machine," filed Dec. 16, 1963, Ser. No. 330,711 now Patent No. 3,293,717. Both inventions are concerned with the molding of pipe sections from concrete or like plastic materials for use in pipe lines, wells, conduits and the like. In both instances the apparatus provides for the effective, efficient and economical casting of a cylindrical form, for subsequent curing, by means operable to compress the opposite ends of the material while in a mold to insure high density of the material, eradicate voids and insure uniform distribution.

In my previous apparatus, the concrete, clay or like plastic composition, having been deposited between the generally cylindrical mold core and the conforming mold casing, was subjected to inwardly directed pressure at both ends of the mold to compact the material, producing a self-sustaining pipe form; the mold core and casing were thereupon withdrawn and the form conveyed to appropriate curing facilities. Transportation of the freshly cast and uncured fragile pipe form is difficult, tedious and hazardous. Thus, it is desirable to provide casting means by which a portion of the mold may be retained in supporting and sustaining relation with the form as it is carried after setting to the curing facilities. Further, it is advantageous to provide means for relative motion between the form and mold during the setting up of the material to produce a troweling action for smoothing the form surface.

In the present invention, one of the objects is to provide casting means whereby, after endwise compression of the material in cylindrical form, the mold core may be withdrawn to permit transportation of the cast pipe form within the mold casing without dislodgement thereof from the casing. The objectives of the invention also include that of providing mold forming elements relatively movable with respect to the form material, during setting, whereby a troweling action upon the form surface may be achieved.

Another object of the present invention is to provide a reciprocating or ram-type mold core, axially movable with respect to the outer mold shell, by a length of movement equal to the full length of the outer shell and of the pipe section. Thus, the core may be fully removed from the cast section while the outer mold shell is left intact.

It is also an object of the invention to provide means for conveniently substituting various sizes and/or configurations of internal and external molding elements without changing the basic apparatus thus providing for the use of the apparatus in the formation of pipe sections of various configurations, wall thickness and internal as well as external diameters.

A further object is to provide pit means below the position of the outer mold shell which pit means provides a location for a ram-type reciprocating core permitting downward withdrawal of the core from the cast material within the shell to facilitate transportation of the pipe form within the mold shell to curing facilities.

Numerous other objects, features and advantages of the present apparatus will be apparent from a consideration of the following specification taken in conjunction with the accompanying drawings in which.

Figure 1:
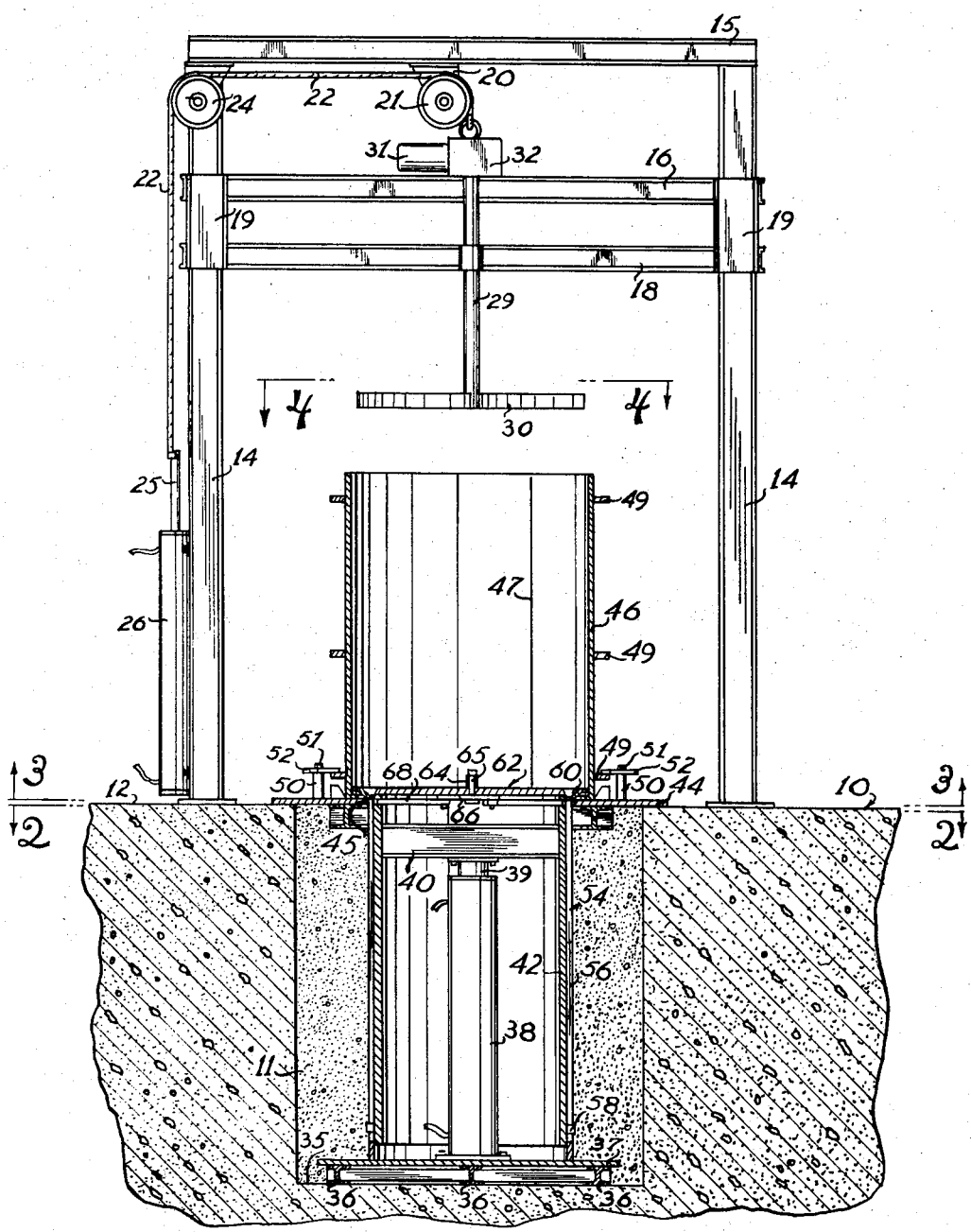
FIG. 1 is a vertical sectional view of one embodiment of the present invention.
Figure 2:
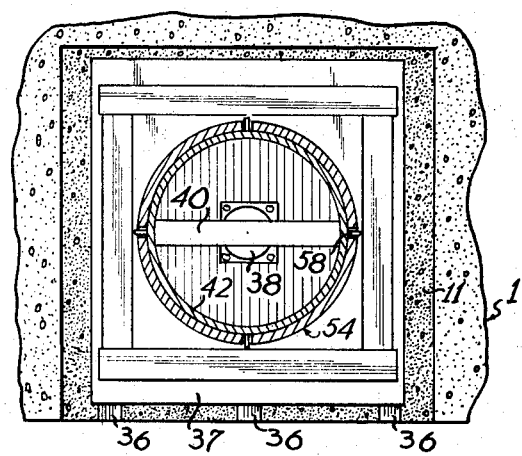
FIG. 2 is a horizontal transverse section taken on line 2—2 of FIG. 1 looking in the direction of the arrows 2—2.

In the present form of the invention, the apparatus is mounted upon a firm foundation 10 here shown as a concrete emplacement defining a pit 11 with a horizontal supporting surface 12 at its upper edge. Erected on opposite sides of pit 11 to extend vertically upward from the surface 12, standards 14 are provided joined at their upper end by a transverse head beam 15. Spaced downward from the head beam 15 there is provided a parallel motor support beam 16 and therebelow a spreader shaft bearing beam 18. The beams 15, 16 and 18 are preferably of convention metal formation compatible with that of the standards 14 here shown as of channel irons. The beam 15 is preferably joined by welding or the equivalent to the upper ends of standards 14. The beams 16 and 18 are united by guide members 19 by which they are slidably mounted for vertical adjustment on the standards 14.

Supported centrally of the beam 15 and depending therebelow is a pulley bracket 20 rotatably supporting pulley 21 for the beam supporting cable 22. Cable 22 extends outwardly from the pulley 21 to be trained over a parallel pulley 24 mounted at the upper end of one of the standards 14 adjacent the head beam 15. From the pulley 24, cable 22 descends vertically to be engaged by a rod 25 of an hydraulic cylinder 26. At its opposite end the cable 22 extends downwardly from the pulley 21 to engage the upper end of slidable beam 16. Thus, the beams 16 and 18 may be vertically adjusted in unison. A rotatable vertical drive shaft 29 of a horizontal rotatable spreader 30, affixed for rotation with the lower end of the drive shaft 29, is journaled on the bearing beam 18. A motor 31 and drive connection, of conventional form, indicated at 32, mounted on motor support beam 16 provides for the rotation of shaft 29 and the spreader 30. By suitable valve control (not shown) hydraulic pressure in the cylinder 26 may be adjusted to raise or lower the beams 16 and 18 to adjust the vertical position of the spreader 30.

Upon the floor 35 of pit 11, there is disposed a rectangular arrangement of horizontal support beams 36 upon which is disposed a platform 37 for a hydraulic ram core cylinder 38. The piston 39 of the ram cylinder 38 mounts a transverse channel iron cross beam 40 the outer ends of which are engaged adjacent the top the inner face of the ram-type mold core 42. By this arrangement, the admission of hydraulic fluid under pressure through control means (not shown), to the cylinder 38 will force the piston 39 upwardly and therewith the cross beam 40 and the mold core 42. It is to be noted that beams 36, platform 37, cylinder 38 and the ram cross beam and core assembly are unitized to provide ease of removal and replacement when different sizes or types of pipe are desired.

At the surface 12 of foundation 10 adjacent the periphery of the pit 11 there is supported in horizontal position a centrally apertured pit cover plate 44, the central aperture 45 of which conforms in size and configuration with the external size and configuration of the mold core 42. In operation there is removably positioned upon the top surface of the pit cover plate 44 the sectional external mold shell 46. The mold shell 46 generally conforms in internal configuration with the external configuration of the mold core 42 but with internal dimensions exceeding that of the core so that when the core 42 is moved upwardly within the shell 46 an elongate cylindrical casting space 48 (FIG. 5) is defined between the outer face of the core 42 and the inner face of the shell 46.

While in common practice concrete or like pipe sections are generally uniform, thin-walled cylindrical members of externally and internally conformingly circular form, it will be understood that the basic concept of the structure of the present invention is not limited to such internal or external configurations. Oval or angular configurations may be provided for either the external core surface or the internal shell surface or both. Further, it will be understood that while the spacing between internal shell surface and external core surface is normally uniform throughout the length of the shell and core, the present invention is not so limited. If desired, non-conforming spacial relations may be provided to meet the demands of specific situations.

The mold shell 46 of the present invention, being circular in the manner referred to in the preceding paragraph, is preferably of conventional divided construction, individual vertical segments are indicated by the line 47 of FIG. 1. For ease of manipullation and for structural strength the shell members are preferably provided with arcuate projecting flanges 49 including an end flange adjacent the pit cover plate 44 when the shell is in casting position. For securing the lower end of the shell 46 on the pit cover plate 44 in desired registration with the aperture 45 of the cover plate 44 there are provided internally threaded vertical studs 50 fixedly secured to the upper face of the pit cover plate 44. The circular arrangement of outwardly spaced stubs 50 receive bolts 51, the straps 52 of which are adapted to be swung into registration over the upper surface of the lower flange 49. The bolts 51 are then threaded downwardly into the studs 50 to firmly secure the shell 46 in desired registration with the aperture 45 of the pit cover plate 44.

With the shell 46 in position over the aperture of the pit cover plate 44 and secured by straps 52, hydraulic fluid may be supplied to the ram cylinder 38 whereby the piston 39 of the ram is raised together with the cross beam 40 and the mold core 42 to position the core within the shell 46 in conventional inward spaced relation thereto to provide the annular casting space 48 between the core 42 and the shell 46. For guiding of the core 42 in its vertical movement upwardly from the pit 11 into the confines of the shell 46, the core is provided with a fitted guide 54. The guide 54 is formed with vertically extending guide slots 56 which receive projecting guide pins 58 of the lower end of the core 42. It is to be noted that the upper end of the slots 56 are open so that after the casting space 48 is filled a further upward movement of the core 42 causes the guide pins 58 to leave the slots 56 and engage a lower end casting stop ring 60 and force it upward compressing the material.

Before the mold core 42 is fully elevated into the shell 46, there is positioned within the shell at its lower end the annular dish-shaped lower end casting stop ring 60, the internal periphery of which conforms snugly to the outer configuration of the core 42. The lower surface of the internal periphery of the end casting stop ring 60 rests upon the upper edges of the guide 54.

Figure 3:
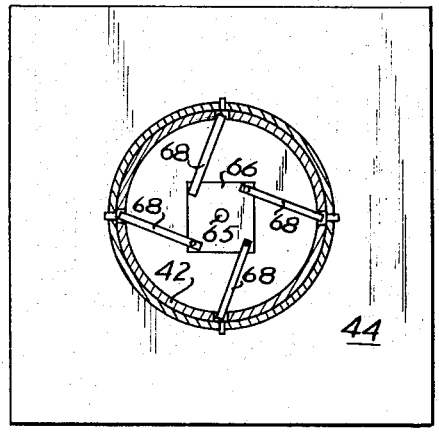
FIG. 3 is a section taken on the line 3—3 of FIG. 1 looking in the direction of the arrows 3—3.
Figure 6:
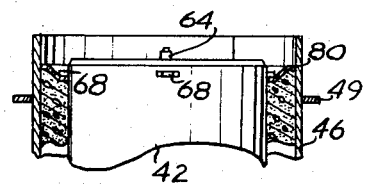
FIG. 6 is a fragmentary vertical sectional view of the core and shell after casting.
Figure 4:
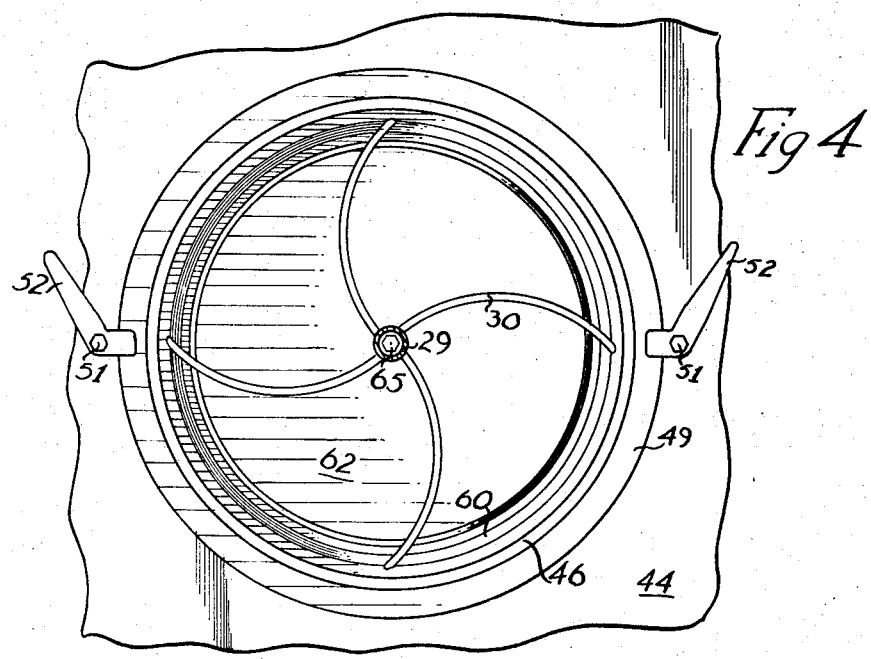
FIG. 4 is a fragmentary detailed sectional view taken on line 4—4 of FIG. 1 illustrating the manner of securement of the outer mold shell during casting.

After the placement of the lower stop ring 60, the core 42 is further elevated by means of the cylinder 38 into its full position within the shell 46 whereby the annular molding space 48 is defined between the core 42 and the inner face of the shell 46. After such location the hydraulic cylinder 26 is operated to raise its rod 25 thereby lowering the spreader 30 to rest upon the closed upper end 62 of the core 42. If desired, the central hub of the arms of the spreader 30 may be recessed to receive therein a pivot boss 64 located centrally on the upper face of the end 62 of the core 42 and receiving therethrough a pivot bolt 65 for locking plate 66 disposed on the inner end of the bolt 65. As seen in FIG. 3, the locking plate 66 is rectangular with outwardly extending arms 68. When extended by rotation of the plate 66, the outer ends of arms 68 pass through the core 42 to engage and lock down an upper end casting stop ring 80 as indicated in FIG. 6.

Figure 5:
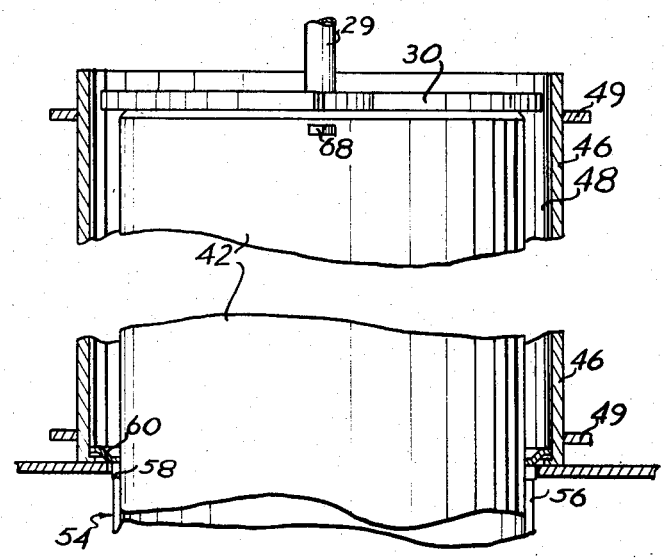
FIG. 5 is a detailed fragmentary vertical sectional view showing the shell and core relationships during casting.

In the operation of the present device, with the core 42 elevated into the shell 46, which has been placed over the aperture 45 of the cover plate 44 of the pit 11, by the admission of pressure to the ram cylinder 38 to elevate the ram 39. The shell 46 and the core 42 are now in position for the casting of the pipe section. It is to be noted that prior to the full upward vertical movement of the core 42, the lower casting stop ring 60 is positioned at the lower end of the shell 46. The spreader 30 is then lowered by upward movement of the rod 25 of the hydraulic cylinder 26 to be positioned as shown in FIG. 5 resting upon the top of the core 42. Upon energization of the motor 31, the spreader shaft 29 and the spreader 30 will be rotated while the plastic concrete, clay material or the like is poured. The spreader insures proper movement of such material to the annular casting space 48 formed between the core 42 and the shell 46. If desired, during the filling of the space 48 conventional vibrators may be inserted to assist in the proper distribution and compaction of the plastic material. Further if desired, during the filling operation the pressure in the cylinder 38 may be varied to periodically move the ram 39 upward and downward to cause the lower casting stop ring to move producing vibration in the material as it is fed into the annular casting space. When the casting space is filled to a level approximately with the top of the elevated core 42, pouring will be discontinued and the spreader 30 elevated.

The upper casting stop ring 80 is then positioned to overlie the top of the concrete material and is secured in position by rotation of the locking plate 66 so that its arms 68 will extend through the walls of the core to engage over the inner flange of the ring 80. In this manner, the ring 80 and the ring 60 secure the plastic material therebetween. It will be noted that since the lower stop ring 60 is precluded from downward movement by resting upon the upper edges of the guide 54, a downward movement of the core will cause an endwise compression from the top of the material between the ring 60 and 80. It is further to be noted that after filling of the material the core may be raised causing the pins 58 to engage the ring 60 forcing the ring upwardly and affecting a compression of the material from the bottom up. It is also to be noted that upon upward movement of the core beyond its position when material is being supplied, the entire body of plastic material may be moved up within the shell 46 the upper stop ring being freely movable as the core moves upwardly. Downward movement of the body of the material may be affected by a return downward movement of the core and the arms will engage the upper ring 80 forcing the entire body downwardly. Such reciprocating motion of the cast material provides an important and beneficial troweling action of both internal and external surfaces of the cast form. It is well known to those skilled in the art that such troweling smoothes the surfaces and provides a sealing of the internal and external skin surfaces of the material.

After the casting space is filled, the compression both downwardly and upwardly having been affected and the troweling completed, the core 42 is fully withdrawn to the position indicated in FIG. 1, and the spreader having been raised, the completed pipe form may be then moved from the present apparatus to a curing facility with the shell 46 still in place. Such maintenance of the material within the shell 46 during such transportation avoids accidents by which the pipe form might be injured or destroyed during movement.

An important feature of the present invention is the fact that the platform 37, the guide 54 and the cover plate 44 form an integral unitized assembly. This, in combination with the open pit 11, permits disposition therein of various types and sizes of cores and if desired, the entire assembly including the ram may be substituted by other types of cores and rams. It will, of course, be understood that in combination with substitution of different type cores, the shell 46 will be substituted by the other shells conforming with the selection of a different type of core.

Thus, from the foregoing, it will be seen that the present invention provides novel and improved means for casting pipe sections and provides facilities for the compression of the material within the casting zone formed between a core and shell, both by downward compression and upward compression. Further, the invention provides the bodily movement of the material within the shell 46 to effect troweling action to improve the surface finish of the pipe form, prior to curing.

It will, of course, be understood that the present structural arrangement is presented by way of example and that in the practice of the invention, numerous changes and modification and the full use of equivalence may be resorted to without departing from the spirit or scope of the invention as outlined in the appended claims.

I claim:

1. A casting machine including a pit, a mold core vertically movable to and from said pit, a mold shell movable to and from registration with said mold core above said pit, a support extending transversely above said pit and above the top of said shell located over said pit and a bodily movable rotatable casting material spreader mounted on said support and means for lowering said spreader to engage the top of said mold core when said mold core is moved vertically from said pit.

2. Casting apparatus comprising a foundation defining a pit, an hydraulic ram positioned in said pit, a mold core connected to said ram and movable to positions inside and above said pit, guide slots positioned in said pit, guide projections extending from said mold core into said guide slots, a cover plate resting on said foundation and defining an aperture therein generally corresponding in size and shape to said mold core whereby said mold core is movable through said aperture, positioning members connected to said cover plate, a cylindrical mold shell generally corresponding in cross sectional shape to and of a diameter larger than said mold core on said cover plate and maintained in coaxial relationship with said mold core and the aperture of said cover plate by said positioning members, said mold shell including an inwardly extending flange at its end adjacent said cover plate, a first annular dish-shaped casting stop ring positioned adjacent said cover plate and resting on the flange of said mold shell between said mold core and said mold shell, support means positioned above said mold shell, a spreader member suspended from said support means, means for lowering said spreader member inside said mold shell, means operatively connected to said spreader member for rotating said spreader member, a second annular dish-shaped casting stop ring positioned between said mold core and said mold shell remote from said cover plate, and means connected to said mold core for locking said second casting stop ring within said mold shell.

3. The invention of claim 2 wherein said mold shell and said first casting stop ring are constructed and arranged so as to be removable from the vicinity of said mold core and said cover plate.

4. The invention of claim 2 wherein said mold shell includes a plurality of outwardly projecting flanges, one of which is engageable with said positioning members.

5. The invention of claim 2 wherein the guide projections of said mold core and the guide slots of said pit are constructed and arranged so that said guide projections engage said first casting stop ring when said mold core is above said pit.

6. An apparatus for casting hollow concrete bodies comprising:
support means;
a cylindrical hollow mold shell releasably fixed to said support means;
a cylindrical core constructed and arranged to be selectively positioned within said mold shell to define a casting space between said mold shell and said core;
power means carried by said support means and connected to said core, said power means constructed and arranged to selectively move said core into and out of said mold shell;
a lower stop ring constructed and arranged to be received in said casting space between said core and said mold shell and supported against downward movement by said support means;
first engaging means carried by the lower end of said core, said first engaging means constructed and arranged to selectively engage said lower stop ring upon upward movement of said core and lift said lower stop ring from said support means, and to release said lower stop ring upon downward movement of said core;
an upper stop ring constructed and arranged to be received in said casting space between said core and said mold shell on top of said concrete to be cast; and,
second engaging means carried by the upper end of said core, said second engaging means constructed and arranged to selectively engage said upper stop ring upon downward movement of said core and force said upper stop ring downwardly, and to release said upper stop ring upon upward movement of said core.

7. An apparatus for casting hollow concrete bodies as set forth in claim 6 wherein said support means includes an annular guide member positioned below said mold shell and defining vertical guide slots therein slidably receiving said first engaging means therethrough to maintain said core in alignment as said core is extended and retracted by said power means.

8. An apparatus for casting hollow concrete bodies as set forth in claim 6 wherein said second engaging means includes a plurality of arms slidably extendable through said core for engagement with said upper stop ring; and means for selectively extending and retracting said arms through said core.

References Cited

UNITED STATES PATENTS

| 1,875,738 | 9/1932 | Jones | 25—30 |
| 2,870,513 | 1/1959 | Gagne | 25—39 X |
| 3,141,222 | 7/1964 | Steiro | 25—30 |

FOREIGN PATENTS 1,157,988 11/1963 Germany.

WILLIAM J. STEPHENSON, *Primary Examiner.*

E. MAR, *Assistant Examiner.*